United States Patent Office 3,790,471
Patented Feb. 5, 1974

3,790,471
CONVERSION WITH ZSM-5 FAMILY OF CRYSTALLINE ALUMINOSILICATE ZEOLITES
Robert J. Argauer, Kensington, Md., and George R. Landolt, Audubon, N.J., assignors to Mobil Oil Corporation
No Drawing. Continuation-in-part of abandoned application Ser. No. 630,933, Apr. 14, 1967, and a division of application Ser. No. 865,472, Oct. 10, 1969, now Patent No. 3,702,886. This application May 18, 1972, Ser. No. 254,799
Int. Cl. C10g *13/02;* C01b *33/28*
U.S. Cl. 208—111                    13 Claims

ABSTRACT OF THE DISCLOSURE

Catalytic conversion of hydrocarbons is carried out by contacting the same with a family of crystalline zeolites designated as ZSM-5 having the composition expressed as mol ratios of oxides as follows:

$$0.9 \pm M_{2/n}O : Al_2O_3 : ySiO_2 : zH_2O$$

wherein M is at least one cation having a valence $n$, $y$ is at least 5 and $z$ is between 0–40, said aluminosilicates characterized by a specific X-ray powder diffraction pattern.

RELATED APPLICATIONS

This application is a continuation-in-part of Ser. No. 630,933, filed Apr. 14, 1967 and now abandoned and a division of Ser. No. 865,472, filed Oct. 10, 1969 now U.S. Pat. 3,702,886.

BACKGROUND OF THE INVENTION (1) Field of the invention

This invention relates to novel crystalline aluminosilicates and to methods for the preparation. More particularly, this invention relates to novel crystalline alumino-silicates having catalytic properties, to methods for preparing the same, and hydrocarbon conversion therewith.

(2) Description of the prior art

Zeolitic materials, both natural and synthetic, have been demonstrated in the past to have catalytic capabilities for various types of hydrocarbon conversion. Certain zeolitic materials are ordered, porous crystalline aluminosilicates having a definite crystalline structure within which there are a large number of small cavities which are interconnected by a number of still smaller channels. These cavities and channels are precisely uniform in size. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves include a wide variety of positive ion-containing crystalline aluminosilicates, both natural and synthetic. These aluminosilicates can be described as a rigid three-dimensional network of $SiO_4$ and $AlO_4$ in which the tetrahedra are cross-linked by the sharing of oxygen atoms whereby the ratio of the total aluminum and silicon atoms to oxygen is 1:2. The electrovalence of the tetrahedra-containing aluminum is balanced by the inclusion in the crystal of a cation, for example, an alkali metal or an alkaline earth metal cation. This can be expressed by formula wherein the ratio of Al to the number of the various cations, such as Ca/2, Sr/2, Na, K, or Li, is equal to unity. One type of cation has been exchanged either in entirety or partially by another type af cation utilizing ion exchange techniques in a conventional manner. By means of such cation exchange, it has been possible to vary the size of the pores in the given aluminosilicate by suitable selection of the particular cation. The spaces between the tetrahedra are occupied by molecules of water prior to dehydration.

Prior art techniques have resulted in the formation of a great variety of synthetic crystalline aluminosilicates. These aluminosilicates have come to be designated by letter or other convenient symbol, as illustrated by zeolite A (U.S. 2,882,243), zeolite X (U.S. 2,882,244), zeolite Y (U.S. 3,130,007), zeolite K-G (U.S. 3,055,654), zeolite ZK-5 (U.S. 3,247,195), zeolite Beta (U.S. 3,308,069), and zeolite ZK-4 (U.S. 3,314,752), merely to name a few.

SUMMARY OF THE INVENTION

The present invention relates to a novel family of ultrastable synthetic siliceous crystalline materials, hereinafter designated as "Zeolite ZSM-5" or simply "ZSM-5" to methods for the preparation and to hydrocarbon conversion processes conducted therewith. The family of ZSM-5 compositions has the characteristic X-ray diffraction pattern set forth in Table 1, hereinbelow. ZSM-5 compositions can also be identified, in terms of mole ratios of oxides, as follows:

$$0.9 \pm 0.2\ M_{2/n}O : W_2O_3 : 5\text{–}100YO_2 : zH_2O$$

wherein M is a cation, $n$ is the valence of said cation, W is selected from the group consisting of aluminum and gallium, Y is selected from the group consisting of silicon and germanium, and $z$ is from 0 to 40. In a preferred synthesized form, the zeolite has a formula, in terms of mole ratios of oxides, as follows:

$$0.9 \pm 0.2\ M_{2/n}O : Al_2O_3 : 5\text{–}100SiO_2 : zH_2O$$

and M is selected from the group consisting of a mixture of alkali metal cations, especially sodium, and tetraalkyl-ammonium cations, the alkyl groups of which preferably contains 2–5 carbon atoms.

The original cations can be replaced in accordance with techniques well-known in the art, at least in part, by ion exchange with other cations. Preferred replacing cations include tetraalkylammonium cations, metal ions, ammonium ions, hydrogen ions, and mixtures of the same. Particularly preferred cations are those which render the zeolite catalytically active, especially for hydrocarbon conversion. These include hydrogen, rare earth metals, aluminum, metals of Groups II and VIII of the Periodic Table and manganese.

In a preferred embodiment of ZSM-5, W is aluminum, Y is silicon and the silica/alumina mole ratio is at least 10 and ranges up to about 60.

Members of the family of zeolites designated herein as ZSM-5 have an exceptionally high degree of thermal stability thereby rendering them particularly effective for use in processes involving elevated temperatures. In this connection, ZSM-5 zeolites appear to be one of the most stable families of zeolites known to date.

Members of the family of ZSM-5 zeolites possess a definite distinguishing crystalline structure whose X-ray diffraction pattern shows the following significant lines:

TABLE 1

| Interplanar Spacing $d$ (A): | Relative intensity |
|---|---|
| 11.1±0.2 | S |
| 10.0±0.2 | S |
| 7.4±0.15 | W |
| 7.1±0.15 | W |
| 6.3±0.1 | W |
| 6.04⎫ ±0.1 | |
| 5.97⎭ | W |
| 5.56±0.1 | W |
| 5.01±0.1 | W |
| 4.60±0.08 | W |

TABLE 1—Continued

| | |
|---|---|
| 4.25±0.08 | W |
| 3.85±0.07 | VS |
| 3.71±0.05 | S |
| 3.04±0.03 | S |
| 2.99±0.02 | W |
| 2.94±0.02 | W |

These values were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, $100I/I_o$, where $I_o$ is the intensity of the strongest line or peak, and $d$ (obs.), the interplanar spacing in A. corresponding to the recorded lines, were calculated. In Table I the relative intensities are given in terms of the symbols S=strong, M=medium, MS=medium strong, MW=medium weak and VS=very strong. It should be understood that this X-ray diffraction pattern is characteristic of all the species of ZSM-5 compositions. Ion exchange of the sodium ion with cations reveals substantialy the same pattern with some relative intensity. Other minor variations can occur depending on the silicon to aluminum ratio of the particular minor shifts in interplaner spacing and variation in sample, as well as if it has been subjected to thermal treatment. Various cation exchanged forms of ZSM-5 have been prepared. X-ray powder diffraction patterns of several of these forms are set forth below. The ZSM-5 forms set forth below are all aluminosilicates.

TABLE 2

X-ray diffraction; ZSM-5 powder in cation exchanged forms; $d$ Spacings observed

| As made | HCl | NaCl | CaCl₂ | ReCl₃ | AgNO₃ |
|---|---|---|---|---|---|
| 11.15 | 11.16 | 11.19 | 11.19 | 11.19 | 11.19 |
| 10.01 | 10.03 | 10.05 | 10.01 | 10.06 | 10.01 |
| 9.74 | 9.78 | 9.80 | 9.74 | 9.79 | 9.77 |
| | | 9.01 | 9.02 | | 8.99 |
| 8.06 | | | | | |
| 7.44 | 7.46 | 7.46 | 7.46 | 7.40 | 7.76 |
| 7.08 | 7.07 | 7.09 | 7.11 | | 7.09 |
| 6.70 | 6.72 | 6.73 | 6.70 | 6.73 | 6.73 |
| 6.36 | 6.38 | 6.38 | 6.37 | 6.39 | 6.37 |
| 5.99 | 6.00 | 6.01 | 5.99 | 6.02 | 6.01 |
| 5.70 | 5.71 | 5.73 | 5.70 | 5.72 | 5.72 |
| 5.56 | 5.58 | 5.58 | 5.57 | 5.59 | 5.58 |
| 5.37 | | 5.38 | 5.37 | 5.38 | 5.37 |
| 5.13 | 5.11 | 5.14 | 5.12 | 5.14 | |
| 4.99 | 5.01 | 5.01 | 5.01 | 5.01 | 5.01 |
| | | 4.74 | | | |
| 4.61 | 4.62 | 4.62 | 4.61 | 4.63 | 4.62 |
| | | 4.46 | 4.46 | | 4.46 |
| 4.36 | 4.37 | 4.37 | 4.36 | 4.37 | 4.37 |
| 4.26 | 4.27 | 4.27 | 4.26 | 4.27 | 4.27 |
| 4.08 | | 4.09 | 4.09 | 4.09 | 4.09 |
| 4.00 | 4.01 | 4.01 | 4.00 | 4.01 | 4.01 |
| 3.84 | 3.85 | 3.85 | 3.85 | 3.86 | 3.86 |
| 3.82 | 3.82 | 3.82 | 3.82 | 3.83 | 3.82 |
| 3.75 | 3.75 | 3.75 | 3.76 | 3.76 | 3.75 |
| 3.72 | 3.72 | 3.72 | 3.72 | 3.72 | 3.72 |
| 3.64 | 3.65 | 3.65 | 3.65 | 3.65 | 3.65 |
| | 3.60 | 3.60 | 3.60 | 3.61 | 3.60 |
| 3.48 | 3.49 | 3.49 | 3.48 | 3.49 | 3.49 |
| 3.44 | 3.45 | 3.45 | 3.44 | 3.45 | 3.45 |
| 3.34 | 3.35 | 3.36 | 3.35 | 3.35 | 3.35 |
| 3.31 | 3.31 | 3.32 | 3.31 | 3.32 | 3.32 |
| 3.25 | 3.25 | 3.26 | 3.25 | 3.25 | 3.26 |
| 3.17 | | | 3.17 | 3.18 | |
| 3.13 | 3.14 | 3.14 | 3.14 | 3.15 | 3.14 |
| 3.05 | 3.05 | 3.05 | 3.04 | 3.06 | 3.05 |
| 2.98 | 2.98 | 2.99 | 2.98 | 2.99 | 2.99 |
| | | | | 2.97 | |
| | 2.95 | 2.95 | 2.94 | 2.95 | 2.95 |
| 2.86 | 2.87 | 2.87 | 2.87 | 2.87 | 2.87 |
| 2.80 | | | | | |
| 2.78 | | | 2.78 | | 2.78 |
| 2.73 | 2.74 | 2.74 | 2.73 | 2.74 | 2.74 |
| 2.67 | | | 2.68 | | |
| 2.66 | | | 2.65 | | |
| 2.60 | 2.61 | 2.61 | 2.61 | 2.61 | 2.61 |
| | 2.59 | | 2.59 | | |
| 2.57 | | 2.57 | 2.56 | | 2.57 |
| 2.50 | 2.52 | 2.52 | 2.52 | 2.52 | |
| 2.49 | 2.49 | 2.49 | 2.49 | 2.49 | 2.49 |
| | | | 2.45 | | |
| 2.41 | 2.42 | 2.42 | 2.42 | 2.42 | |
| 2.39 | 2.40 | 2.40 | 2.39 | 2.40 | 2.40 |
| | | | 2.38 | 2.35 | 2.38 |
| | 2.33 | | 2.33 | 2.32 | 2.33 |
| | 2.30 | | | | |
| | 2.24 | 2.23 | 2.23 | | |
| 2.20 | 2.21 | 2.20 | 2.20 | | |
| 2.18 | 2.18 | | | | |
| | | 2.17 | 2.17 | | |
| | 2.13 | | 2.13 | | |
| | 2.11 | 2.11 | | 2.11 | |
| | | | 2.10 | 2.10 | |
| | 2.08 | 2.08 | | 2.08 | 2.08 |
| | | | 2.07 | 2.07 | |
| | | | 2.04 | | |
| 2.01 | 2.01 | 2.01 | 2.01 | 2.01 | 2.01 |
| 1.99 | 2.00 | 1.99 | 1.99 | 1.99 | 1.99 |
| | | | 1.97 | 1.96 | |
| 1.95 | 1.95 | 1.95 | 1.95 | 1.95 | |
| | | | | 1.94 | |
| | 1.92 | 1.92 | 1.92 | 1.92 | 1.92 |
| 1.91 | | | | 1.91 | |
| | | | | 1.88 | |
| 1.87 | 1.87 | 1.87 | 1.87 | 1.87 | 1.87 |
| | 1.86 | | | | |
| 1.84 | 1.84 | | | 1.84 | 1.84 |
| 1.83 | 1.83 | 1.83 | 1.83 | 1.83 | |
| 1.82 | | 1.81 | | 1.82 | |
| 1.77 | 1.77 | 1.79 | 1.78 | | 1.77 |
| 1.76 | 1.76 | 1.76 | 1.76 | 1.76 | 1.76 |
| | | 1.75 | | | 1.75 |
| | 1.74 | 1.74 | 1.73 | | |
| 1.71 | 1.72 | 1.72 | 1.71 | | 1.70 |
| 1.67 | 1.67 | 1.67 | | 1.67 | 1.67 |
| 1.66 | 1.66 | | 1.66 | 1.66 | 1.66 |
| | | 1.65 | 1.65 | | |
| | | 1.64 | 1.64 | | |
| | 1.63 | 1.63 | 1.63 | 1.63 | 1.62 |
| | 1.61 | 1.61 | 1.61 | | 1.61 |
| 1.58 | | | | | |
| | 1.57 | 1.57 | | 1.57 | 1.57 |
| | | 1.56 | 1.56 | 1.56 | |

While ZSM-5 zeolites are useful in cracking and hydrocracking, they are outstandingly useful in other petroleum refining processes indicating again the unique catalytic characteristics of this family of zeolites. The later processes include isomerization of n-paraffins and naphthenes, polymerization of compounds containing an olefinic or acetylinic carbon to carbon linkage such as isobutylene and butene-1, reforming, alkylation, isomerization of polyalkyl substituted aromatics, e.g., ortho xylene and disproportionation of aromatics, such as toluene to provide a mixture of benzene, xylenes and higher methylbenzenes. The ZSM-5 catalysts have exceptional high selectivity and under the conditions of hydrocarbon conversion provide a high percentage of desired products relative to total products compared with known zeolitic hydrocarbon conversion catalysts.

ZSM-5 zeolites, as indicated above, are also useful in other catalytic processes, such as catalytic cracking of hydrocarbons and hydrocracking. In addition to the thermal stability of this family of zeolites under these conditions, they provide conversion of the cracked oil to materials having lower molecular weights and boiling points which are of greater economic value. The ability to be physically stable under high temperatures and/or in the presence of high temperature steam is extremely important for a cracking catalyst. During catalytic conversion, the reaction which takes place is essentially a cracking to produce hydrocarbons. However, this cracking is accompanied by a number of complex side reactions such as aromatization, polymerization, alkylation and the like. As a result of these complex reactions, a carbonaceous deposit is laid down on the catalyst which is referred to by petroleum engineers as "coke." The deposit of coke on the catalyst tends to seriously impair the catalyst efficiency for the principal reaction desired and to substantially decrease the rate of conversion and/or the selectivity of the process. Thus, it is common to remove the catalyst after coke has been deposited thereon and to regenerate it by burning the coke in a stream of oxidizing gas. The regenerated catalyst is returned to the conversion stage of the process cycle. The enhanced thermal stability of ZSM-5 is advantageous in this regard.

ZSM-5 zeolites can be used either in the alkali metal form, e.g., the sodium form, the ammonium form, the hydrogen form, or another univalent or multivalent cationic form. Preferably, one or other of the last two forms is employed. They can also be used in intimate combination with a hydrogenating component such as tungsten, vanadium, molybdenum, rhenium, nickel, cobalt, chromium, manganese, or a noble metal such as platinum or palladium where a hydrogenation dehydrogenation function is to be performed. Such component can be exchanged into the composition, impregnated therein or physically intimately admixed therewith. Such component can be impregnated in or on to ZSM-5 such as, for example, by, in the case of platinum, treating the zeolite with a platinum metal-containing ion. Thus, suitable platinum compounds include chloroplatinic acid, platinous chloride and various compounds containing the platinum ammine complex.

The compounds of the useful platinum or other metals can be divided into compounds in which the metal is present in the cation of the compound and compounds in which it is present in the anion of the compound. Both types of compounds which contain the metal in the ionic state can be used. A solution in which platinum metals are in the form of a cation or cationic complex, e.g., $$Pt(NH_3)_6Cl_4$$

is particularly useful. For some hydrocarbon conversion processes, this noble metal form of the ZSM-5 catalyst is unnecessary such as in low temperature, liquid phase ortho xylene isomerization.

ZSM-5, when employed either as an adsorbent or as a catalyst in one of the aforementioned processes, should be dehydrated at least partially. This can be done by heating to a temperature in the range of 200 to 600° C. in an atmosphere such as air, nitrogen, etc. and at atmospheric or subatmospheric pressures for between 1 and 48 hours. Dehydration can aso be performed at lower temperatures merely by placing the ZSM-5 catalyst in a vacuum, but a longer time is required to obtain a sufficient amount of dehydration.

Zeolite ZSM-5 can be suitably prepared by preparing a solution containing tetrapropyl ammonium hydroxide, sodium oxide, an oxide of aluminum or gallium, an oxide of silica or germanium, and water and having a composition, in terms of mole ratios of oxides, falling within the following ranges:

TABLE 3

| | Broad | Preferred | Particularly preferred |
|---|---|---|---|
| $OH^-/YO_2$ | 0.07–10.0 | 0.1–0.8 | 0.2–0.75 |
| $R_4N^+/(R_4N^++Na^+)$ | 0.2–0.95 | 0.3–0.9 | 0.4–0.9 |
| $H_2O/OH^-$ | 10–300 | 10–300 | 10–300 |
| $YO_2/W_2O_3$ | 5–100 | 10–60 | 10–40 | wherein R is propyl, W is aluminum or gallium and Y is silicon or germanium maintaining the mixture until crystals of the zeolite are formed. It is note that an excess of tetrapropylammonium hydroxide can be used which would raise the value of $OH^-/YO_2$ above the ranges set forth supra. The excess hydroxide, of course, does not participate in the reaction. Thereafter, the crystals are separated from the liquid and recovered. Typical reaction conditions consist of heating the foregoing reaction mixture to a temperature of from about 100° C. to 175° C. for a period of time of from about six hours to 60 days. A more preferred temperature range is from about 150 to 175° C. with the amount of time at a temperature in such range being from about 12 hours to 8 days.

The digestion of the gel particles is carried out until crystals form. The solid product is separated from the reaction medium, as by cooling the whole to room temperature, filtering, and water washing.

The foregoing product is dried, e.g., at 230° F., for from about 8 to 24 hours. Of course, milder conditions may be employed if desired, e.g., room temperature under vacuum.

ZSM-5 is preferably formed as an aluminosilicate. The composition can be prepared utilizing materials which supply the appropriate oxide. Such compositions include for an aluminosilicate, sodium aluminate, alumina, sodium silicate, silica hydrosol, silica gel, silicic acid, sodium hydroxide and tetrapropylammonium compounds, e.g., tetrapropylammonium hydroxide. It will be understood that each oxide component utilized in the reaction mixture for preparing a member of the ZSM-5 family can be supplied by one of more initial reactants and they can be mixed together in any order. For example, sodium oxide can be supplied by an aqueous solution of sodium hydroxide, or by an aqueous solution of sodium silicate; tetrapropylammonium cation can be supplied by the bromide salt. The reaction mixture can be prepared either batchwise or continuously. Crystal size and crystallization time of the ZSM-5 composition will vary with the nature of the reaction mixture employed.

DESCRIPTION OF SPECIFIC EMBODIMENTS

Members of the ZSM-5 family can have the original cations associated therewith replaced by a wide variety of other cations according to techniques well known in the art. Typical replacing cations would include hydrogen, ammonium and metal cations including mixtures of the same. Of the replacing metallic cations, particular preference is given to cations of metals such as rare earth metals, manganese, calcium, as well as metals of Group II of the Periodic Table, e.g., zinc, and Group VIII of the Periodic Table, e.g., nickel.

Typical ion exchange techniques would be to contact the members of the family of ZSM-5 zeolites with a salt of the desired replacing cation or cations. Although a wide variety of salts can be employed, particular preference is given to chlorides, nitrates and sulfates.

Representative ion exchange techniques are disclosed in a wide variety of patents including U.S. 3,140,249; U.S. 3,140,251; and U.S. 3,140,253.

Following contact with the salt solution of the desired replacing cation, the zeolites are then preferably washed with water and dried at a temperature ranging from 150° F. to about 600° F. and thereafter calcined in air or other inert gas at temperatures ranging from about 500° F. to 1500° F. for periods of time ranging from 1 to 48 hours or more.

Regardless of the cations replacing the sodium in the synthesized form of the ZSM-5 the spatial arrangement of the aluminum, silicon and oxygen atoms which form the basic crystal lattices of ZSM-5, remains essentially unchanged by the described replacement of sodium or other alkali metal as determined by taking an X-ray powder diffraction pattern of the ion-exchanged material. Such X-ray diffraction pattern of the ion-exchanged ZSM-5 reveals a pattern substantially the same as that set forth in Table 1 above.

The aluminosilicates prepared by the instant invention are formed in a wide variety of particular sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst is molded, such as by extrusion, the aluminosilicate can be extruded before drying or dried or partially dried and then extruded.

In the case of many catalysts, it is desired to incorporate the ZSM-5 with another material resistant to the temperatures and other conditions employed in organic conversion processes. Such materials include active and inactive materials and synthetic or naturally occurring zeolites as well as inorganic materials such as clays, silica and/or metal oxides. The latter may be either naturally occurring or in the form of gelatinous precipitates or gels including mixtures of silica and metal oxides. Use of a material in conjunction with the ZSM-5, i.e., combined therewith which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. Normally, zeolite materials have been incorporated into naturally occurring clays, e.g., bentonite and kaolin, to improve the crush strength of the catalyst under commercial operating conditions. These materials, i.e., clays, oxides, etc., function as binders for the catalyst. It is desirable to provide a catalyst having good crush strength, because in a petroleum refinery the catalyst is often subjected to rough handling, which tends to break the catalyst down into powder-like materials which cause problems in procesing. These clay binders have been employed for the purpose of improving the crush strength of the catalyst.

Naturally occurring clays which can be composited with the ZSM–5 catalyst include the montmorillonite and kaolin family, which families include the sub-bentonites, and the kaolins commonly known as Dixie McNamee-Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the ZSM–5 catalyst can be composited with a porous matrix material such as silica-alumina, silica-magnesia, silica-zirconia, silica-thoria, siilca-beryllia, silica-titania as well as ternary compositions such as silica-alumina-thoria, silica-alumina-zircona, silica-alumina-magnesia and silica-magnesia-zirconia. The matrix can be in the form of a cogel. The relative proportions of finely divided crystalline aluminosilicate ZSM–5 and inorganic oxide gel matrix vary widely with the crystalline aluminosilicate content ranging from about 1 to about 90 percent by weight and more usually, particularly when the composite is prepared in the form of beads in the range of about 2 to about 50 percent by weight of the composite.

Employing the ZSM–5 catalyst of this invention, containing a hydrogenation component, heavy petroleum residual stocks, cyclic stocks, and other hydrocrackable charge stocks can be hydrocracked at temperatures between 400° F. and 825° F. using molar ratios of hydrogen to hydrocarbon charge in the range between 2 and 80. The pressure employed will vary between 10 and 2,500 p.s.i.g. and the liquid hourly space velocity between 0.1 and 10.

Employing the catalyst of this invention for catalytic cracking hydrocarbon cracking stocks can be cracked at a liquid hourly space velocity between about 0.5 and 50, a temperature between about 550° F. and 1100° F., a pressure between about subatmospheric and several hundred atmospheres.

Employing a catalytically active form of a member of the ZSM–5 family of zeolites of this invention containing a hydrogenation component, reforming stocks can be reformed employing a temperature between 700° F. and 1000° F. The pressure can be between 100 and 1000 p.s.i.g. but is preferably between 200 and 700 p.s.i.g. The liquid hourly space velocity is generally between 0.1 and 10, preferably between 0.5 and 4 and the hydrogen to hydrocarbon mole ratio is generally between 1 and 20 preferably between 4 and 12.

The catalyst can also be used for hydroisomerization of normal paraffins, when provided with a hydrogenation component, e.g., platinum. Hydroisomerization is carried out at a temperature between 200 and 700° F., preferably 300 to 550° F., with a liquid hourly space velocity between 0.01 and 2, preferably between 0.25 and 0.50 employing hydrogen such that the hydrogen to hydrocarbon mole ratio is between 1:1 and 5:1. Additionally, the catalyst can be used for olefin isomerization employing temperatures between 30° F. and 500° F.

Other reactions which can be accomplished employing the catalyst of this invention containing a metal, e.g., platinum, include hydrogenation-dehydrogenation reactions and desulfurization reactions.

In order to more fully illustrate the nature of the invention and the manner of practicing the same, the following examples are presented.

In the examples which follow whenever adsorption data is set forth it was determined as follows:

A weighed sample of the zeolite was contacted with the desired pure adsorbate vapor in an adsorption chamber at a pressure less than the vapor-liquid equilibrium pressure of the adsorbate at room temperature. This pressure was kept constant during the adsorption period which did not exceed about eight hours. Adsorption was complete when a constant pressure in the adsorption chamber was reached, i.e., 12 mm. of mercury for water and 20 mm. for n-hexane and cyclohexane. The increase in weight was calculated as the adsorption capacity of the sample.

Example 1

This example illustrates the preparation of zeolite ZSM–5. 22.9 grams $SiO_2$ was partially dissolved in 100 ml. 2.18 N tetrapropylammonium hydroxide by heating to a temperature of about 100° C. There was then added a mixture of 3.19 grams $NaAlO_2$ (comp: 42.0 wt. percent $Al_2O_3$, 30.9 wt. percent $Na_2O$, 27.1 wt. percent $H_2O$) dissolved in 53.8 ml. $H_2O$. The resultant mixture had the following composition: 0.382 mole $SiO_2$, 0.0131 mole $Al_2O_3$, 0.0159 mole $Na_2O$, 0.118 mole $[(CH_3CH_2CH_2)_4N]_2O$, 6.30 moles $H_2O$. The mixture was placed ni a Pyrex lined autoclave and heated at 150° C. for six days. The resultant solid product was cooled to room temperature, removed, filtered, washed with 1 liter $H_2O$ and dried at 230° F. A portion of this product was subjected to X-ray analysis and identified as ZSM–5. A portion of the product was calcined at 1000° F. in air for 16 hours and the following analyses were obtained:

TABLE 4

| | |
|---|---|
| Wt. percent $SiO_2$ | 93.62 |
| Wt. percent $Al_2O_3$ | 4.9 |
| Wt. percent $Na_2O$ | 1.48 |
| Total | 100.00 |
| $SiO_2/Al_2O_3$ | 32.5 |
| $Na_2O/Al_2O_3$ | 0.5 |
| Wt. percent n-hexane adsorbed | 10.87 |
| Wt. percent cyclohexane adsorbed | 3.60 |
| Wt. percent $H_2O$ adsorbed | 9.15 |

Example 2

This example illustrates another preparation of Zeolite ZSM–5. 22.9 grams of $SiO_2$ were partially dissolved in 85.5 ml. of 2.21 N $(CH_3CH_2CH_2)_4NOH$ by heating to a temperature of about 100° C. There was then added a mixture of 2.86 grams of sodium aluminate (44.5 weight percent $Al_2O_3$, 30.1 percent $Na_2O$, 25.4 percent $H_2O$) dissolved in 53.8 ml. water and 0.07 gram aluminum turnings (to maintain the Si/Al molar ratio) dissolved in 21 ml. of 2.21 N $(CH_3CH_2CH_2)_4NOH$.

The resultant mixture had the following composition: 0.382 mole $SiO_2$, 0.0138 mole $Al_2O_3$, 0.0139 mole $Na_2O$, 0.236 mole $(CH_3CH_2CH_2)_4NOH$, and 6.25 moles $H_2O$. This composition was placed in a Pyrex lined autoclave, heated to 150° C., and maintained at this temperature for five days. The resultant solid product was cooled to room temperature, removed, filtered and washed with 1 liter of water. The product was both grainy and dilatant. Microscopic examination showed the presence of very small crystals (on the order of 1 micron) along with some gel particles. The product was then calcined at 1000° F. The analysis of this product is reported in the following table.

TABLE 5
Preparation of ZSM–5 at 150° C.

Reaction composition (moles):
- $SiO_2$ ---------------------------------- 0.382
- $Al_2O_3$ -------------------------------- 0.0138
- $Na_2O$ ---------------------------------- 0.139
- $(CH_2CH_2CH_2)_4NOH$ -------------------- 0.236
- $H_2O$ ----------------------------------- 6.25

Products:
- Na, wt. percent ------------------------- 2.03
- $Al_2O_3$, wt. percent ------------------ 5.07
- $SiO_2$, wt. percent -------------------- 92.7
- $SiO_2/Al_2O_3$ ------------------------- 31.1
- $Na_2O/Al_2O_3$ ------------------------- 0.89

Sorption properties of product:
- Wt. percent cyclohexane _____percent__ 3.3
- n-Hexane _____do____ 9.7
- Water _____do____ 8.3

X-ray diffraction analysis indicates the product to be a novel crystalline material having an X-ray pattern of Table 1.

Examples 3–5

The procedure of Example 2 was repeated, using the same reaction composition, however, varying both the temperature and time of heat treatment. Thus, the temperatures employed were, respectively, 125° C. (5½ days), 150° C. (8 days), and 175° C. (5 days). The results are reported in the table below. The calcined products of Examples 3–5 showed that substantially no change in crystal structure had occurred as a result of calcination.

TABLE 6
Preparation of ZSM-5

| | Example | | |
|---|---|---|---|
| | 3 | 4 | 5 |
| Time, days | 8 | 5½ | 5 |
| Temperature, °C | 150 | 125 | 175 |
| Reaction composition: Moles: | | | |
| $SiO_2$ | 0.382 | 0.382 | 0.38 |
| $Al_2O_3$ | 0.138 | 0.138 | 0.138 |
| $Na_2O$ | 0.0139 | 0.0139 | 0.0139 |
| $(CH_3CH_2CH_2)_4NOH$ | 0.236 | 0.236 | 0.236 |
| $H_2O$ | 6.25 | 6.25 | 6.25 |
| Product:[1] | | | |
| Na, wt. percent | 1.7 | 2.1 | 1.6 |
| $Na_2O$, wt. percent | 2.29 | 2.82 | 2.15 |
| $Al_2O_3$, wt. percent | 4.47 | 3.55 | 4.3 |
| $SiO_2$, wt. percent | 93.30 | 93.7 | 93.2 |
| Total, as oxides | 100.1 | 100.1 | 99.65 |
| $SiO_2/Al_2O_3$ | 35.5 | 45.0 | 37.0 |
| $Na_2O/Al_2O_3$ | 0.86 | 1.31 | 0.83 |
| Physical properties—Adsorption: | | | |
| Cyclohexane, wt. percent | 3.63 | 5.83 | 2.52 |
| $H_2O$, wt. percent | 9.52 | 7.33 | 9.8 |
| n-$C_6$, wt. percent | 9.81 | 9.67 | 10.10 |

[1] Calcined 1,000° F.

As can be seen from the above table, the calcined crystalline products obtained in Examples 3–5 were investigated in order to ascertain whether these products exhibited selective absorption properties. It will be noted that the data shows that the crystalline aluminosilicate zeolites of the present invention absorb more straight chain paraffins than cyclic aliphatics.

Example 6

This example also illustrates a method for preparing Zeolite ZSM–5. 137.4 grams $SiO_2$ was partially dissolved in 648 ml. 2.18 N $(CH_3CH_2CH_2)_4NOH$ by heating to a temperature of about 100° C. There was then added a mixture of 19.08 grams $NaAlO_2$ (composition: 42.0 wt. percent $Al_2O_3$, 30.9% $Na_2O$, 27.1% $H_2O$) dissolved in 322.5 ml. $H_2O$. The mixture was placed in a pyrex lined autoclave and heated at 150° C. for 9 days. The resultant solid product was cooled to room temperature, removed, filtered, washed with 2 liters $H_2O$ and dried at 230° F. A portion of this product was subjected to X-ray analysis and identified as ZSM–5. A portion of the subjected product was calcined at 1000° F. in air for 16 hours and the following analyses were obtained:

- Wt. percent $SiO_2$ ---------------------- 94.6
- Wt. percent $Al_2O_3$ -------------------- 3.8
- Wt. percent $Na_2O$ --------------------- 1.93

Total ----------------------------------- 100.33

Sorption and other data are set forth in Table 7.

TABLE 7

Physical Properties:
- Surface area, m.$^2$/g. -------------------- 299

Sorption:
- Cyclohexane, wt. percent ----------------- 3.32
- n-Hexane, wt. percent -------------------- 9.50
- Water, wt. percent ----------------------- 6.18

X-ray analysis:
- Type ------------------------------------- ZSM–5
- Crystallinity, percent ------------------- 100

In order to investigate the thermal stability of the Zeolite of Example 6, five portions of the same were subjected to direct calcination in air at temperatures of 1000, 1500, 1600, 1700, and 1850° F., respectively. The crystal structure remained stable at each of the first four temperatures. At 1850° F. some decrease in crystallinity was observed, probably due to sintering at this higher temperature. Results are shown in Table 8.

TABLE 8
Thermal stability of ZSM-5

| Calcination Temp.: | | | | | |
|---|---|---|---|---|---|
| °F | 1,000 | 1,500 | 1,600 | 1,700 | 1,850 |
| °C | 538 | 815 | 871 | 927 | 1,010 |
| Calcined 10 hours in air | | | | | |
| Adsorption: | | | | | |
| Normal hexane, wt. percent | 9.50 | 8.80 | 8.23 | 8.80 | 2.05 |
| Water, wt. percent | 6.18 | 4.02 | 3.67 | 3.20 | 0.78 |
| X-ray analysis: crystallinity, percent | 100 | 100 | 100 | 100 | 65 |

Example 7

Inasmuch as the crystalline aluminosilicate zeolites of this invention are characterized by a rather high silica/alumina ratio, it was postulated that they would have an unusually stable structure. Accordingly, a series of alternating water sorptions and calcinations at 1000° F. was carried out using about 1 gram of the product obtained in Example 3. The results are summarized in Table 9. It will be noted that the hydrothermal treatments did not have any adverse effect on the water adsorption properties.

TABLE 9
Hydrothermal stability of ZSM-5
[Description, calcined at 1,000° F.]

| | Calcination treatments | Number of sorption | | | | |
|---|---|---|---|---|---|---|
| | | 1 | 2 | 3 | 4 | 5 |
| Adsorption: | | | | | | |
| $H_2O$, wt. percent | 7.85 | 7.85 | 7.50 | 7.54 | 7.67 | 8.00 |
| Cyclohexane, wt. percent | 4.45 | | | | | |
| n-Hexane, wt. percent | 10.31 | | | | | |

Examples 8–15

Samples of the product of Example 3 were subjected to ion exchange using various ion exchange solutions. In each instance, the ion exchange solution was a saturated aqueous solution, at 180° F. The exchange was carried out batchwise using 500 ml. of saturated solution per gram of product. The exchanged products were than water washed until free of chloride. The samples were then tested for sorption characteristics. The details and results are reported in Table 10.

TABLE 10
Ion-exchanged forms of ZSM-5

| | Example number | | | | | | | |
|---|---|---|---|---|---|---|---|---|
| | 8 a | 9 b | 10 c | 11 c | 12 c | 13 c | 14 c | 15 c |
| Ion exchanged—Saturated solutions at 180° F | | AgNO₃ | AgNO₃ | CaCl₂ | NH₄Cl | ReCl₃ | NaCl | 0.5 NHCl |
| Composition: | | | | | | | | |
| Na, wt. percent | 1.7 | 0.46 | 0.12 | <0.05 | <0.05 | 1.2 | 1.37 | 0.22 |
| Na₂O, wt. percent | 2.99 | 0.62 | 0.16 | | | 1.62 | 1.94 | 0.30 |
| Al₂O₃, wt. percent | 4.47 | 2.90 | 2.62 | 2.84 | 6.25 | 6.58 | 3.20 | 3.45 |
| SiO₂, wt. percent | 93.30 | 93.56 | 91.60 | 94.80 | 90.30 | 88.50 | 93.80 | 96.10 |
| Total, as oxides | 100.06 | | 100.22 | 98.72 | 96.55 | 98.42 | 98.84 | 99.85 |
| SiO₂/Al₂O₃ (molar ratio) | 35.5 | 60.7 | 59.5 | 56.8 | 24.6 | 22.8 | 49.7 | 47.4 |
| Equivalents M/g. atom aluminum | 0.86 | | 1.08 | 0.63 | | 0.48 | 0.95 | 0.015 |
| Physical properties—Adsorption: | | | | | | | | |
| Cyclohexane, wt. percent | 3.63 | | | | | | | |
| n-Hexane, wt. percent | 9.81 | | 9.48 | 10.34 | 11.08 | 9.62 | 9.72 | 10.77 |
| H₂O, wt. percent | 9.52 | | 6.37 | 7.16 | 8.88 | 7.33 | 8.18 | 7.50 |
| X-ray analysis | | | | Crystalline material | | | | |
| Exchanged ion, wt. percent | | 2.12 Ag | 5.43 Ag | 0.88 Ca | | 1.72 Re₂O₃ | | | a 8 days at 150° C.; calcined at 1,000° F.
b Dried at 230° F.
c Calcined at 1,000° F.

Examples 16–20

Example 15 was repeated wherein samples of ZSM-5 were exchanged with 0.5 N HCl. Thereafter the so exchanged products were subjected to further ion exchange with either Na⁺, Ca⁺⁺, (RE)⁺⁺⁺, or Ag⁺ (Examples 17–20, respectively). The results are set forth in Table 11.

TABLE 11
ZSM-5 (0.5 N HCl treated, calcined at 1000° F.

| | Example number | | | | |
|---|---|---|---|---|---|
| | 16 | 17 | 18 | 19 | 20 |
| Treatment | (¹) | (¹) | (¹) | (¹) | (¹) |
| Ion exchanged—Saturated solutions at 180° F | | NaCl | CaCl₂ | ReCl₃ | AgNO₃ |
| Composition, wt. percent: | | | | | |
| Re₂O₃ | | | | 1.60 | |
| CaO | | | 0.14 | | |
| Ag₂O | | | | | 6.07 |
| Al₂O₃ | 2.95 | 2.56 | 2.62 | 2.91 | 3.10 |
| SiO₂ | 97.1 | 95.0 | 97.5 | 94.4 | 91.4 |
| Total, as oxides | 100.2 | 99.2 | 100.8 | 99.7 | 100.7 |
| Moles SiO₂/Al₂O₃ | 56 | 63 | 63 | 55 | 50 |
| Equivalents M/aluminum | 0.1 | 1.05 | 0.46 | 0.60 | 0.91 |
| Adsorption, wt. percent: | | | | | |
| n-Hexane | 10.92 | 8.85 | 9.64 | 10.27 | 9.82 |
| Water | 7.96 | 6.90 | 7.18 | 7.52 | 5.92 |
| X-ray analysis | | | Crystalline material | | |

¹ 0.5 N HCl treated, calcined at 1,000° F.

The initial exchange with 0.5 N HCl resulted in a highly crystalline product which did not appear to contain amorphous material.

Example 21

A product made as described in Example 15, wherein ZSM-5 was ion-exchanged with 0.5 N HCl was tested for cracking activity using n-hexane. The results are reported in Table 12.

TABLE 12
Catalytic cracking activity of ZSM-5 zeolite

| Composition: | |
|---|---|
| Wt. percent SiO₂ | 92.9 |
| Wt. percent Al₂O₃ | 5.04 |
| Wt. percent Na | 0.44 |
| Sorption, wt. percent: | Unsteamed |
| n-Hexane | 10.2 |
| Water | 8.2 |
| Cyclohexane | 8.2 |
| | Unsteamed |
| Alpha value ¹ | 680 |
| n-Hexane conversion (percent) | ² 99.3 |

¹ The alpha test is a measure of cracking activity. This test is described in a letter to the editor entitled "Superactive Crystalline Aluminosilicate Hydrocarbon Cracking Catalysts" by P. B. Weisz and J. N. Miale, Journal of Catalysts, vol. 4, No. 4, August 1965, pp. 527–529.
² At 800° F.

The following examples serve to demonstrate that ZSM-5 can be prepared using tetrapropylammonium bromide (TPABR) instead of tetrapropylammonium hydroxide. In addition, another example (22) was performed using silica gel as a source of silica. Preparational details of each of these examples are given below and summarized in Table 13.

Example 22

In preparing this example, 11.45 grams silica gel was dissolved in 238 grams 10% tetrapropylammonium hydroxide solution. To this was added with stirring the 1.6 grams NaAlO₂ (43.5 wt. percent Al₂O₃, 30.05 wt. percent Na₂O) dissolved in 3 grams water. This mixture was then charged to an autoclave vessel and held at 149° C. for six days at autogenous pressure. The resulting product was separated from soluble components by filtering and washing, X-ray analysis of the dried (100–110° C.) sample showed the product to be crystalline ZSM-5.

Example 23

This example was prepared by first dissolving the tetrapropyl bromide (31.2 grams) and caustic (4.83 grams NaOH 77.5 wt. percent Na₂O) in water. To this was added the sodium aluminate (1.6 grams NaAl₂ 43.5% Al₂O₃-30.05 wt. percent Na₂O) dissolved in some of the water. Finally, the silica component, commercial Ludox colloidal silica, 30% SiO₂ was added to the mixture. This mixture was charged to an autoclave and held at about 150° C. for six days at autogenous pressure. The resulting product, after filtering and washing, was shown by X-ray analysis to be crystalline ZSM-5.

Example 24

This example was prepared in a manner similar to that discussed under Example 23 differing only in the amount of caustic used and time of crystallization. X-ray analyses showed the product to be crystalline ZSM-5.

TABLE 13
ZSM-5 preparations from TEPABr

| | Examples | | |
|---|---|---|---|
| | 22 | 23 | 24 |
| Formulation: | | | |
| SiO₂ gel, g | 11.45 | | |
| Ludox (LS), g | | 38.17 | 38.17 |
| NaAlO₂ ², g | 1.6 | 1.6 | 1.6 |
| NaOH³, g | | 4.83 | 1.3 |
| H₂O, g | 3.0 | 200 | 200 |
| 10% TPAOH ⁴, g | 238 | | |
| TPABr, g | | 31.21 | 312.1 |
| Mole ratios: | | | |
| SiO₂ | 28 | 27.93 | 27.93 |
| Al₂O₃ | 1.0 | 1.0 | 1.0 |
| Na₂O | 1.04 | 9.99 | 3.52 |
| (R₄N)₂O | 8.56 | | |
| H₂O | 1,730 | 1,847.5 | 1,847.5 |
| R₄N⁺ | 17.1 | 17.0 | 17.0 |
| Na⁺ | 2.08 | 19.97 | 7.04 |
| OH⁻ | 19.18 | 19.97 | 7.04 |
| [Na₂O + (R₄N)₂O]SiO₂ | 0.343 | | |
| R₄N⁺/(R₄N⁺ + Na⁺) | 0.892 | .4598 | .707 |
| OH⁻/SiO₂ | 0.685 | .715 | .2521 |
| H₂O/[(R₄N)₂O + Na₂O] | 180 | | |
| H₂O/(R₄N⁺ + Na⁺) | 88 | 49.97 | 76.85 |
| H₂O/OH⁻ | 88 | 49.97 | 76.85 |
| SiO₂/Al₂O₃ | | 27.93 | 27.93 |

TABLE 13—Continued

| | Examples | | |
|---|---|---|---|
| | 22 | 23 | 24 |
| Crystallization: | | | |
| 24 hr | | | 100% ZSM-5 |
| 69 hr | | | 100% ZSM-5 |
| 6 days | 60% ZSM-5 | 95% ZSM-5 | |
| 7 days | | | |
| Product analysis, moles: | | | |
| SiO₂ | 11.7 | | 83.5 |
| Al₂O₃ | 1.0 | | 1.0 |
| Na₂O | 0.48 | | 0.63 |
| (R₄N)₂O | 0.63 | | 5.55 |

¹ 30% SiO₂.
² Al₂O₃ wt. percent 43.5 Na₂O 30.05.
³ NaOH 77.5% Na₂O.
⁴ 10% water solution.

Example 26

ZSM-5 was prepared from tetrapropylammonium hydroxide and Ludox. 76.3 grams Ludox (30 wt. percent SiO₂) were added to 3.19 grams NaAlO₂ (42 wt. percent Al₂O₃, 35 wt. percent Na₂O) dissolved in 99 ml. 2.37 N tetrapropylammonium hydroxide and 9 ml. H₂O. A smooth, creamy gel formed immediately, which was mixed for three minutes. This was placed in Pyrex liner in an autoclave and run five days at 175° C. and autogenous pressure. The product was removed, filtered, washed once with one liter H₂O, and dried at 230° F. Microscopic examination showed mainly crystalline material <1μ. Reaction composition and product analysis are reported in Table 14.

Example 27

ZSM-5 was prepared from tetrapropylammonium bromide and sodium hydroxide. 3.19 grams NaAlO₂ (42 wt. percent Al₂O₃, 35 wt. percent Na₂O) were dissolved in 9.44 grams NaOH in 60 ml. H₂O. 63 grams tetrapropylammonium bromide were added and mixed until dissolved. 76.3 grams Ludox (30 wt. percent SiO₂) were then added hot and rapidly and mixed for five minutes. A thick, lumpy gel formed immediately. This was placed in a Pyrex liner in an autoclave and run eight days at 175° C. and autogenous pressure. A very hard product was removed, filtered, washed with 200 ml. H₂O, and dried at 230° F. Microscopic examination showed mainly large rod-shaped crystals to 8 x 20μ, some large cubes to 25μ. Reaction composition and product analysis are reported in Table 14.

TABLE 14
Reaction and product compositions

| | Example | |
|---|---|---|
| | 26 | 27 |
| Time, days | 5 | 8 |
| Temperature, °C | 175 | 175 |
| Type | (¹) | (²) |
| Reaction composition, moles: | | |
| SiO₂ | 0.382 | 0.381 |
| Al₂O₃ | 0.0131 | 0.0131 |
| [(C₃H₈)₄N]₂O | 0.118 | 0.118 |
| H₂O | 6.30 | 6.30 |
| Na₂O | 0.0159 | 0.1306 |
| R₄N/(R₄N + Na) | 0.881 | 0.644 |
| SiO₂/Al₂O₃ | 29.2 | 29.1 |
| OH⁻/SiO₂ | 0.618 | 0.619 |
| H₂O/OH⁻ | 26.7 | 26.7 |
| Product composition: | | |
| Na₂O, wt. percent | 1.72 | 7.3 |
| Al₂O₃, wt. percent | 4.0 | 8.3 |
| SiO₂, wt. percent | 94.9 | 87.4 |
| Total | 100.62 | 103.0 |
| SiO₂/Al₂O₃ | 40.3 | 18.0 |
| Na₂O/Al₂O₃ | 0.71 | 1.42 |
| Adsorption: | | |
| Cyclohexane, wt. percent | 5.07 | |
| Normal hexane, wt. percent | 10.15 | |
| Water, wt. percent | 6.50 | |
| X-ray analysis | ZSM-5 | ZSM-5 |

¹ TPA—OH plus Ludox.
² TPABr plus NaOH.

What is claimed is:

1. A process for converting a hydrocarbon charge which comprises contacting the same under hydrocarbon conversion conditions with a catalyst resulting from thermal treatment of a crystalline aluminosilicate zeolite having a composition in terms of mole ratios of oxides as follows:

$$0.9 \pm 0.2 M_{2/n}O : Al_2O_3 : YSiO_2 : zH_2O$$

wherein M is at least one cation having a valence $n$, Y is at least 5 and z is between 0 and 40, said thermally treated aluminosilicate catalyst having the X-ray diffraction lines of Table 1 of the specification.

2. The process of claim 1 wherein Y is 5–100.

3. The process of claim 1 wherein M comprises the cation selected from the group consisting of alkyl ammonium, metal, ammonium, hydrogen and mixtures thereof.

4. A process for cracking a hydrocarbon charge which comprises contacting the same under cracking conditions with a catalyst resulting from thermal treatment of a crystalline aluminosilicate zeolite having a composition in terms of mole ratios of oxides as follows:

$$0.9 \pm 0.2 M_{2/n}O : Al_2O_3 : YSiO_2 : zH_2O$$

wherein M is at least one cation having a valence $n$, Y is at least 5 and z is between 0 and 40, said thermally treated aluminosilicate catalyst having the X-ray diffraction lines of Table 1 of the specification.

5. The process of claim 4 wherein Y is 5–100.

6. The process of claim 4 wherein M comprises the cation selected from the group consisting of alkyl ammonium, metal, ammonium, hydrogen and mixtures thereof.

7. A process for hydrocracking a hydrocarbon charge which comprises contacting the same in the presence of hydrogen under hydrocracking conditions with a catalyst resulting from thermal treatment of a crystalline aluminosilicate zeolite having a composition in terms of mole ratios of oxides as follows:

$$0.9 \pm 0.2 M_{2/n}O : Al_2O_3 : YSiO_2 : zH_2O$$

wherein M is at least one cation having a valence $n$, Y is at least 5 and z is between 0 and 40, said thermally treated aluminosilicate catalyst having the X-ray diffraction lines of Table 1 of the specification.

8. The process of claim 7 wherein Y is 5–100.

9. The process of claim 7 wherein M comprises the cation selected from the group consisting of alkyl ammonium, metal, ammonium, hydrogen, and mixtures thereof.

10. A process for isomerization of polyalkyl substituted aromatics which comprises contacting the same under isomerization conditions with a catalyst resulting from thermal treatment of a crystalline aluminosilicate zeolite having a composition in terms of mole ratios of oxides as follows:

$$0.9 \pm 0.2 M_{2/n}O : Al_2O_3 : YSiO_2 : zH_2O$$

wherein M is at least one cation having a valence $n$, Y is at least 5 and z is between 0 and 40, said thermally treated aluminosilicate catalyst having the X-ray diffraction lines of Table 1 of the specification.

11. The process of claim 10 wherein the polyalkyl substituted aromatic is ortho-xylene.

12. A process for the disproportionation of alkyl aromatics which comprises contacting the same under conversion conditions with a catalyst resulting from thermal treatment of a crystalline aluminosilicate zeolite having a composition in terms of mole ratios of oxides as follows:

$$0.9 \pm 0.2 M_{2/n}O : Al_2O_3 : YSiO_2 : zH_2O$$

wherein M is at least one cation having a valence $n$, Y is at least 5 and $z$ is between 0 and 40, said thermally treated aluminosilicate catalyst having the X-ray diffraction lines of Table 1 of the specification.

13. The process of claim 12 wherein the alkyl aromatic is toluene.

References Cited

UNITED STATES PATENTS

| | | | |
|---|---|---|---|
| 2,882,243 | 4/1959 | Milton | 423—329 |
| 3,054,657 | 9/1962 | Breck | 423—329 |
| 3,248,170 | 4/1966 | Kvetinskas | 423—328 |
| 3,306,922 | 2/1967 | Barrer et al. | 260—448 R |
| 3,308,069 | 3/1967 | Wadlinger et al. | 252—455 Z |
| 3,459,676 | 8/1969 | Kerr | 423—329 |

DELBERT E. GANTZ, Primary Examiner

G. E. SCHMITKONS, Assistant Examiner

U.S. Cl. X.R.

208—120; 252—455 Z; 260—668 A, 672 T

UNITED STATES PATENT OFFICE
CERTIFICATE OF CORRECTION

Patent No. 3,790,471      Dated February 5, 1974

Inventor(s) ROBERT J. ARGAUER and GEORGE R. LANDOLT

It is certified that error appears in the above-identified patent and that said Letters Patent are hereby corrected as shown below:

Column 3, line 24,    "substantialy" should be --substantially--.

Column 3, line 25,    "relative intensity." should be --minor shifts in interplanar spacing and variation in relative intensity.--

Column 3, line 27,    Delete "minor shifts in interplaner spacing and variation in".

Column 4, line 9,    Under heading "NaCl" - insert --2.07--.
Under heading "$RECl_3$"- delete "2.07".

Column 5, line 53,    "note" should be --noted--.

Column 8, line 29,    "ni" should be --in--.

Column 9, line 8,    "$(CH_2CH_2CH_2)$" should be --$(CH_3CH_2CH_2)$--.

Column 9, line 52,    Example 5 (Adsorption) $H_2O$, wt.%, "9.8" should be --9.48--.

Column 11, line 8,    Example 8 (Composition) $Na_2O$, wt.%, "2.99" should be --2.29--.

Column 11, line 64,    cyclohexane "8.2" should be --3.1--.

Column 14, line 6,    "ovides" should be --oxides--.

Signed and sealed this 7th day of January 1975.

(SEAL)
Attest:

McCOY M. GIBSON JR.      C. MARSHALL DANN
Attesting Officer      Commissioner of Patents